United States Patent [19]

Harris et al.

[11] 4,152,090
[45] May 1, 1979

[54] HOLE CUTTING APPARATUS UTILIZING A CYLINDER SAW

[75] Inventors: Allan Harris, Newport Beach; Lemuel H. Huff, Anaheim, both of Calif.

[73] Assignee: Johns-Manville Corporation, Denver, Colo.

[21] Appl. No.: 835,607

[22] Filed: Sep. 22, 1977

[51] Int. Cl.² .................... B23B 47/28; B23B 41/00
[52] U.S. Cl. .............................. 408/104; 408/115 R; 408/204
[58] Field of Search .............. 408/72 R, 97, 103, 104, 408/105, 108, 110, 115 R, 115 B, 204, 206, 241 G; 33/185 R

[56] References Cited

U.S. PATENT DOCUMENTS

| | | | |
|---|---|---|---|
| 2,749,781 | 6/1956 | Herzl | 408/97 |
| 2,794,469 | 4/1957 | Shortell | 408/206 |
| 3,465,620 | 9/1969 | Hilburn | 408/15 |
| 3,537,337 | 11/1970 | Best | 408/72 X |
| 3,847,501 | 11/1974 | Doty | 408/108 |
| 3,922,107 | 11/1975 | Fowler | 408/204 X |
| 4,060,333 | 11/1977 | White | 408/204 X |

*Primary Examiner*—Robert Louis Spruill
*Attorney, Agent, or Firm*—Robert M. Krone; Joseph J. Kelly; Gregory W. O'Connor

[57] ABSTRACT

An apparatus for cutting a hole through the sidewall of a longitudinally extending pipe is disclosed herein. This apparatus includes a cylinder saw, i.e., a hole saw and a portable jig for supporting and guiding the saw during the hole cutting operation.

10 Claims, 4 Drawing Figures

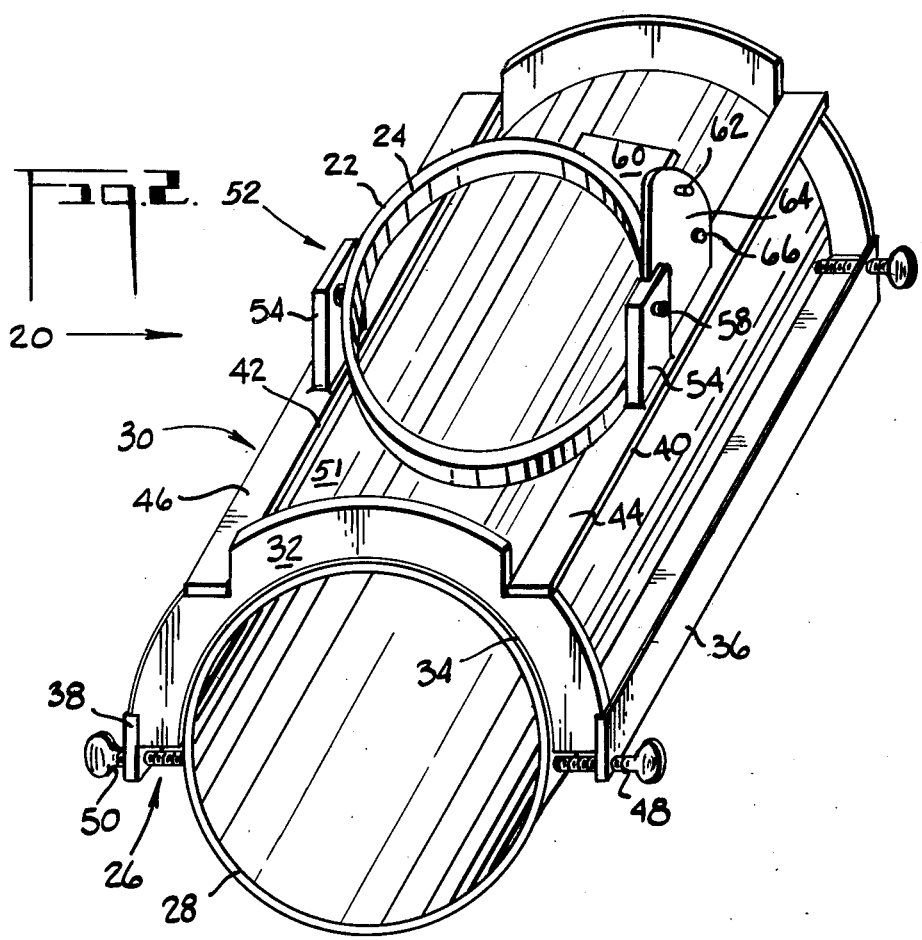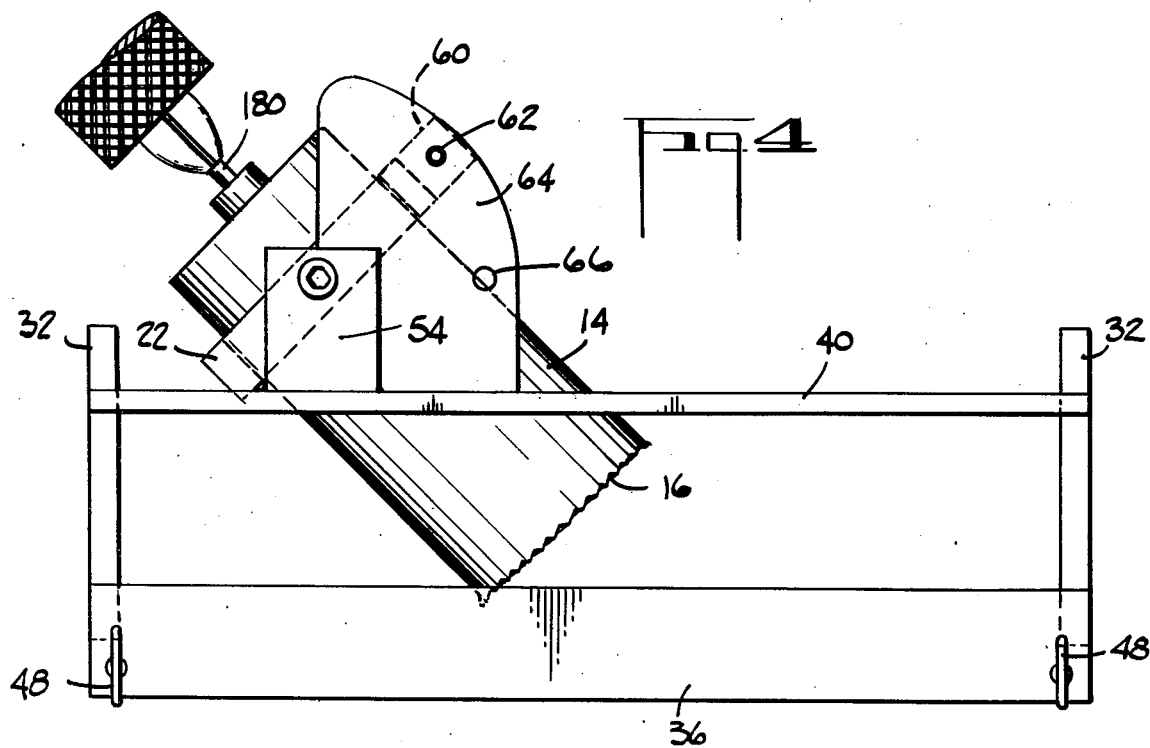

HOLE CUTTING APPARATUS UTILIZING A CYLINDER SAW

BACKGROUND OF THE INVENTION

The present invention relates generally to a hole cutting apparatus and more particularly to a portable apparatus, that is, one which can be utilized in the field, for cutting a hole through the sidewall of a longitudinally extending pipe using a cylinder or hole saw for accomplishing this.

Under certain circumstances, it is necessary to tap into an existing section of pipe at some point along its length. This requires that a hole be cut through the sidewall of the pipe at the point of connection and a cross pipe of some sort be assembled in sealing engagement about this hole. In one conventional method of doing this, the hole is cut through the sidewall of the pipe utilizing a cylinder saw blade. This blade is typically supported on and driven by a conventional drill rig which, except for axial movement, is fixed in place. Because the hole can be provided with great precision, the cross pipe, that is the pipe to be tapped in place, can be accurately positioned around the opening, in many cases without the utilization of special sealing gaskets or the like. While this particular method is quite satisfactory for its intended purpose, it is extremely difficult to carry it out in the field since the drill rig used to support and guide the cylinder saw blade is quite large and cumbersome. As an alternative in the field, it has heretofore been common practice to utilize a keyhole saw to provide the appropriately sized opening for tap-in purposes. One drawback with this approach is that it is time consuming and a more serious drawback is that the hole itself is not usually accurately provided. In order to compensate for this, it has been the general practice to provide additional sealing means around the tap-in connection and in most cases a saddle strapped around the main pipe and supporting the tapped-in pipe is often necessary.

As will be seen hereinafter, the present invention is directed to an apparatus, specifically a portable apparatus, which can be readily used in the field for supporting and guiding a cylinder saw blade used in cutting a hole through the sidewall of a longitudinally extending pipe, thereby eliminating the various drawbacks discussed above.

SUMMARY OF THE INVENTION

One object of the present invention is to provide a portable apparatus or jig, that is, one which can be readily used in the field, for supporting and guiding a cylinder saw used in cutting a hole through the sidewall of a longitudinally extending pipe.

Another object of the present invention is to provide an uncomplicated, relatively lightweight and economical apparatus or jig of the type just described.

A further object of the present invention is to provide an overall apparatus, that is, one including the cylinder saw itself, for cutting a hole through the sidewall of a longitudinally extending pipe.

As just stated, this overall apparatus includes the cylinder saw as well as the apparatus or jig for supporting and guiding the saw used in cutting a hole through the sidewall of a longitudinally extending pipe. The saw itself includes a cylinder saw blade having a longitudinally extending cylindrical body and saw teeth located circumferentially around the front end thereof and means for rotating the blade about its own axis. The jig used in supporting and guiding the cylinder saw includes an annular guide ring adapted to receive the cylindrical body of the saw in a close fitting but slidable fashion and a guide ring support assembly which includes a first support arrangement fixedly connected to and against the pipe to be tapped and a second support arrangement fixedly attached to the first arrangement. This latter support arrangement includes means for supporting the annular guide ring in a fixedly movable manner so that the ring can be adjustably fixed in a plurality of different positions.

As will become more apparent hereinafter, the overall apparatus briefly described above is one which can be readily utilized in the field for cutting a hole through the sidewall of a longitudinally extending pipe. Moreover, because of this apparatus, a hole can be provided in as precise a manner as was previously accomplished at the manufacturing or plant site. This ability to provide a precise opening in the field allows the tap-in to be made without the utilization of additional gaskets, saddle clamps or the like.

BRIEF DESCRIPTION OF THE DRAWINGS

FIG. 2 is an apparatus for supporting and guiding a cylinder saw, for example the cylinder saw illustrated in FIG. 1, used in cutting a hole through the sidewall of a longitudinally extending pipe.

FIG. 4 is a side elevational view of the apparatus illustrated in FIG. 2.

DETAILED DESCRIPTION AND PREFERRED EMBODIMENTS

Figure 1:
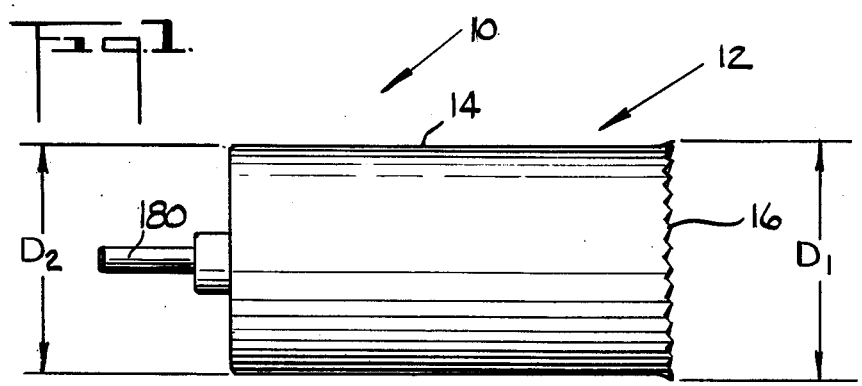
FIG. 1 is a perspective view of a cylinder saw which is utilized in accordance with the present invention.

Turning to the Drawings, wherein like components are designated by like reference numerals throughout the various figures, attention is first directed to FIG. 1 which illustrates a cylinder or hole saw utilized in the apparatus of the present invention. This saw, generally designated by the reference numeral 10 includes a cylinder saw blade 12, preferably a steel blade, having a longitudinally extending cylindrical body 14 and saw teeth 16 located circumferentially around the front end of body 14. As illustrated in FIG. 1, the teeth 16 are conventionally set in a standard manner relative to one another, that is, alternately bent inward and outward a slight amount. Accordingly, the outermost diameter at the cutting end of the saw blade, that is, at teeth 16, as indicated by D1, is slightly greater than the outer diameter of body 14, as indicated by D2. The importance of recognizing this relationship will become apparent hereinafter.

Cylinder saw 10 also includes any suitable but portable arrangement for driving blade 12, that is, for rotating the blade around its longitudinal axis. One such arrangement comprises a power drill chuck attachment 18 which, as illustrated, is suitably attached to the back end of the saw blade and an associated power drill (not shown).

It should be quite apparent that it would be difficult to provide a precisely contoured hole through the sidewall of a longitudinally extending pipe by utilizing this saw in and by itself, that is, without a support and/or guide. However, in accordance with the present invention, saw 10 is utilized with a jig or apparatus which is provided for supporting and guiding the saw and which is constructed in accordance with the present invention.

Figure 3:
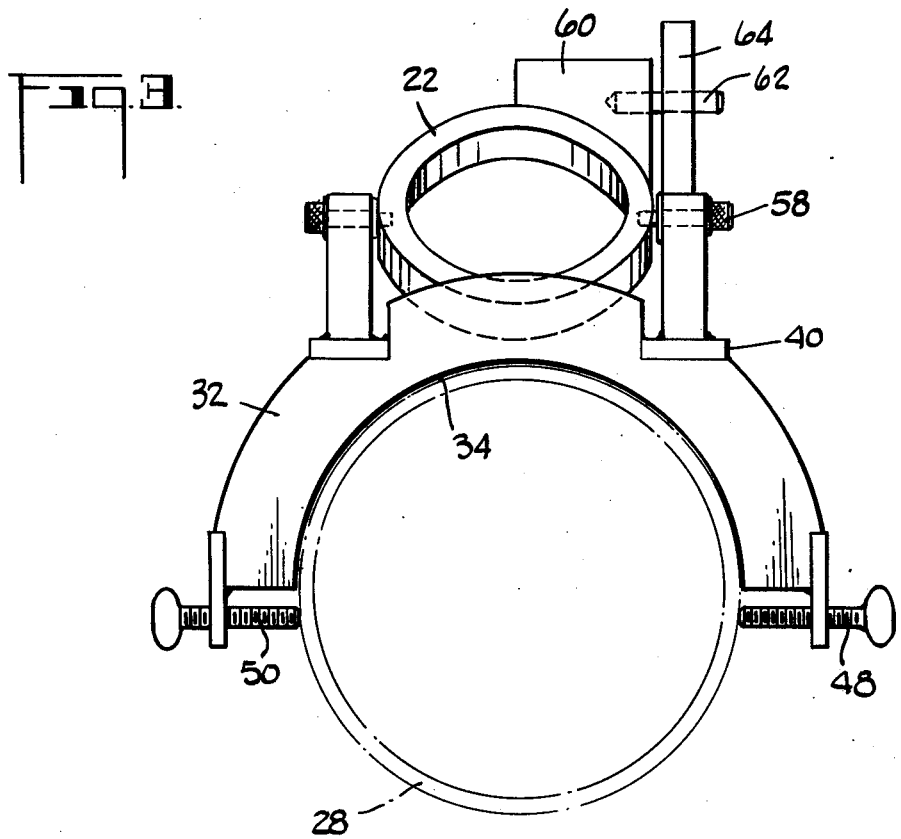
FIG. 3 is an end elevational view of the apparatus illustrated in FIG. 2.

Turning specifically to FIGS. 2-4, attention is directed to this jig or apparatus which, as stated, is constructed in accordance with the present invention and which is generally designated by the reference numeral 20. As illustrated, jig 20 includes an annular guide ring 22 which, as will be seen, is adapted to receive the cylindrical body 14 of saw 10 in a close fitting but slidable fashion. Because of this particular relationship between the guide ring and saw body, the guide ring preferably includes an inner circumferential liner 24 which is constructed of a metal different than the metal making up the cylinder saw body. For example, where the saw blade is constructed of steel, the circumferential liner may be for example brass. This surface to surface contact of different metals minimizes burring of the steel.

Jig 20 also includes a guide ring support assembly 26 which, as will be seen hereinafter, is adapted to support guide ring 22 in a position directly over a longitudinal top segment of the pipe to be tapped, specifically pipe 28 indicated by dotted lines in FIG. 2. More specifically, this support assembly maintains the guide ring in a fixed position longitudinally and vertically with respect to pipe 28 but allows the ring to be pivotally movable between a number of different positions. Moreover, as will be seen, this assembly includes means for adjustably fixing the ring at any one of these positions. In this manner, the entire jig can be fixedly positioned over a top segment of pipe 28 and the ring can be prepositioned at a certain angle, specifically the desired angle of the opening to be provided. With the jig in this position, ring 22 can be used to support and guide the cylinder saw blade 12 as it rotates for cutting the hole in the sidewall of the pipe.

To accomplish the foregoing, the guide ring support assembly includes a longitudinally extending first support arrangement 30 adapted for positioning to and against the longitudinal top segment of the pipe such that a section of the pipe, as least as large as the hole to be cut, remains exposed to the ambient surroundings. In this regard, for purposes of description, it will be assumed that the pipe 28 extends horizontally which, in fact, would be the most logical position for it during the hole cutting operation. As illustrated in FIGS. 2-4, this first arrangement 30 includes two end braces 32 which are generally semicircular in configuration and which include inner semicircular surfaces 34 defined by a diameter identical to the outer diameter of pipe 28. In this manner, the two end braces fit snugly around and across the top half of pipe 28, as illustrated best in FIGS. 2 and 3. Support arrangement 30 also includes a number of longitudinally extending support bars, specifically support bars 36, 38, 40 and 42 in the preferred embodiment, for interconnecting braces 32 to one another but for maintaining these braces a specific distance apart from one another. if desired, the surfaces 34 can be "V" shaped whether surfaces 34 are V-shaped or conform to the outer surface of pipe 28, braces 32 act to precisely align support bars 36, 38, 40 and 42 attached thereto.

As illustrated in FIG. 4, support bar 36 is connected at its opposite ends to corresponding bottom, outer edges of braces 32. The support bar is welded to the braces or otherwise suitably attached thereto. Support bar 38 is connected to the two end braces on the opposite sides thereof, in the same manner as support bar 36. As best illustrated in FIG. 3, both of these support bars extend down beyond the lowermost edges of the end braces. The two support bars 40 and 42 are also connected at their respective ends to end braces 32, as illustrated in the various figures. Like support bars 36 and 38, support bars 40 and 42 may be welded or otherwise suitably fastened to the end braces. However, these latter support bars are located a slight distance above and inwardly of support bars 36 and 38 and are actually positioned so as to define horizontally extending top surfaces 44 and 46, respectively.

As stated above, support arrangement 30 is positioned over and against a longitudinal top segment of pipe 28. Normally the arrangement 30 will stay in position on the pipe. However, for safety purposes, means may be provided for maintaining this first support arrangement fixed in this position. For example, as illustrated in FIGS. 2 and 3, a pair of set screws 48 and 50 are thread connected through cooperating threaded openings in support bars 36 and 38 and are adapted to engage tightly against the outer surface of pipe 28. It should be noted that with support arrangement 30 in this position, a section of the pipe indicated at 51, located between support bars 40 and 42, remains exposed to the ambient surroundings. Inasmuch as the hole to be provided through the sidewall of pipe 28 will be provided in this section, the section must be at least as large as the hole.

In addition to the foregoing, assembly 30 includes a second support arrangement 52 positioned over the first arrangement and, as will be seen, fixedly attached thereto. This second arrangement, as will also be seen, includes means for supporting ring 22 above the exposed section 51 of pipe 28 such that the ring is pivotally movable about a horizontal axis located above the pipe and perpendicular to the axis thereof. This second support arrangement includes confronting support plates 54 which are mounted to the top surfaces 44 and 46 of support bars 40 and 42 at a point between end braces 34, specifically at a point directly above exposed segment 51 of pipe 28. These support plates may be connected to surfaces 44 and 46 in any suitable manner, as for example by welding the lower edge of support plates 54 to the top surfaces 44 and 46 of support bars 40 and 42. As also illustrated best in FIG. 2, annular guide ring 22 is positioned directly between these two support plates and mounted for pivotal movement thereto by any suitable means, for example pivot pins 58. With the guide ring supported in this manner, it can be readily seen that it can pivot about an axis which extends from one pivot pin to the other, that is, about a horizontal axis which is normal to the horizontal axis of pipe 28.

Guide ring support assembly 30 also includes suitable means for adjustably fixing the guide ring in at least two positions and actually in any plurality of positions, about its horizontal pivot axis. In the particular embodiment illustrated, a right-angled plate 60 is welded or otherwise suitably connected to a bottom surface of the ring 22. More specifically, one leg of this angled member is welded or otherwise suitably connected to the ring while the other leg extends down therefrom. This downwardly extending leg includes a single opening adapted to receive a longitudinally extending pin element 62. A second plate, specifically a flat plate 64 is welded or otherwise suitably connected to one edge of one of the support plates 54, as illustrated. Plate 64 includes a plurality of openings 66, each of which is also adapted to receive pin element 62. Openings 66 are positioned such that each one is in confronting relationship with the opening in plate 60 when ring 22 is in a different pivotal position. In this manner, the pin can be inserted into the confronting openings to maintain the ring in a fixed position. Any reasonable number of openings 66 can be provided. Typically, one is provided in a position which allows the ring to be maintained fixed in a horizontal position, that is, positioned such that its longitudinal axis extends vertically and intersects the axis of pipe 28 and in a number of other positions such that its axis is at an acute angle with and intersects the axis of the pipe. Thus it can be seen that when surfaces 34 are positioned on and against the segment of pipe 28 and thus engage the outer surface of pipe 28, the longitudinally extending first support arrangement 30 and second support arrangement 52 cooperate to maintain the longitudinal axis of the guide ring (and hence the longitudinal axis of the cylinder saw blade 12) in an intersecting relationship with the longitudinal axis of the pipe segment 28 regardless of the angle of intersection between these two axes as determined by the alignment of pin 62 with a selected one of openings 66.

From the foregoing, it can be seen that to drill a hole in pipe 28, the body 14 of cylinder saw blade 12 is positioned concentrically with end ring 22. In this regard, it should be noted that the outermost dimension of the saw blade at teeth 16, that is the diameter D1, is slightly greater than the outermost diameter of the saw blade body represented by D2, as stated previously. In a preferred embodiment of the present invention, the inner diameter of ring 22 is greater than this D2 dimension, as it must be in order to slidably receive the blade body. However it is preferably not as great as the dimension D1, that is, the dimension of the blade teeth 16. In this way, the saw blade rotates more efficiently and with less vibration than would be the case if the ring were substantially larger than the saw blade body, that is, larger than the outermost dimension D1. However, this means that the saw blade cannot be inserted into the ring from its front end. This means that the saw blade has to be removed from the power drill and inserted into the ring from its back end, that is, the end including chuck attachment 18. While this may be somewhat inconvenient, it does have the advantage of providing more efficient operation. If desired, the end ring 22 could be a hinged split ring to facilitate mounting. However, this could cause a maintenance problem and would have a higher initial cost.

In any event, once the saw blade is positioned within ring 22 as illustrated in FIG. 4, the ring is fixed in the desired position and the chuck is interlocked to the power drill for driving it, that is, rotating it in order to drill the appropriate hole through segment 51 of the pipe.

What is claimed is:

1. An apparatus for supporting and guiding a cylinder saw blade used in cutting a hole through the sidewall of a longitudinally extending cylindrical pipe, said apparatus comprising:
   (a) an annular guide ring having a longitudinal axis and including means for receiving the cylindrical body of said cylinder saw blade in a close fitting but slidable fashion; and
   (b) a guide ring support assembly including
      (i) a longitudinally extending first support arrangement for positioning to and against a longitudinal segment of said pipe, said first support arrangement including surfaces for engaging said segment, said surfaces being spaced from one another along the longitudinal axis of said segment a specific distance so as to align said first support arrangement along said longitudinal axis of said segment and such that a section of said pipe at least as large as said hole remains exposed to the ambient surroundings,
      (ii) a second support arrangement positioned on said first arrangement and fixedly attached thereto, said second arrangement including means for supporting said ring adjacent said exposed section of said pipe, said first support arrangement and said second support arrangement cooperating such that said longitudinal axis of said annular guide ring and said longitudinal axis of said segment of said pipe intersect when said surfaces engage said segment.

2. An apparatus according to claim 1 and further comprising:
   (a) means for pivotally supporting said ring for movement around an axis spaced from the exposed surface of said pipe and extending in a transverse direction perpendicular to the longitudinal axis of said pipe; and
   (b) means for adjustably fixing said ring in at least two different angular positions relative to said pipe.

3. An apparatus according to claim 2 wherein one of said adjustably fixed positions is such that the longitudinal axis of said ring is normal to and intersects the longitudinal axis of said pipe and wherein a second one of said adjustably fixed positions is such that the longitudinal axis of said ring is at an acute angle with and intersects the axis longitudinal of said pipe.

4. An apparatus according to claim 3 and further comprising:
   (a) means for maintaining said first support arrangement fixed in said position to and against said pipe.

5. An apparatus for cutting a hole through the sidewalls of a longitudinally extending cylindrical pipe, said apparatus comprising:
   (a) a cylinder saw including a cylinder saw blade having a longitudinally extending cylindrical body, saw teeth located circumferentially around one end thereof and means for rotating said blade about its own longitudinal axis;
   (b) an annular guide ring positioned concentrically around said cylindrical body of said saw blade for supporting said cylindrical body in a close fitting but slidable fashion such that the longitudinal axis of said guide ring corresponds to the longitudinal axis of said cylinder saw; and
   (c) a guide ring support assembly including
      (i) a longitudinally extending first support arrangement including means for positioning to and against a longitudinal top segment of said pipe, said means for positioning including surfaces for engaging said segment, said surfaces being spaced from one another along the longitudinal axis of said segment a specific distance so as to align said first support arrangement along said longitudinal axis of said segment and such that a section of said pipe at least as large as said hole remains exposed to the ambient surroundings, and
      (ii) a second support arrangement positioned on said first arrangement and fixedly attached thereto, said second arrangement including means for supporting said ring and saw adjacent said exposed section of said pipe, said first support arrangement and said second support arrangement cooperating such that said longitudinal axis of said annular guide ring and said longitudinal axis of said segment of said pipe intersect when said surfaces engage said segment.

6. An apparatus according to claim 5 and further comprising:
(a) means for pivotally supporting said ring for movement around an axis spaced from the exposed surface of said pipe and extending in a transverse direction perpendicular to the longitudinal axis of said pipe; and
(b) means for adjustably fixing said ring in at least two different angular positions relative to said pipe.

7. An apparatus according to claim 6 wherein one of said adjustably fixed positions is such that the longitudinal axis of said saw is normal to and intersects the longitudinal axis of said pipe and wherein a second one of said adjustably fixed positions is such that the longitudinal axis of said saw is at an acute angle with and intersects the longitudinal axis of said pipe.

8. An apparatus according to claim 7 and further comprising:
(a) means for maintaining said first support arrangement fixed in said position to and against said pipe.

9. An apparatus according to claim 5 wherein said saw teeth are set so as to define an outermost diameter greater than the outer diameter of said cylindrical body and wherein the inner diameter of said guide ring is greater than the outer diameter of said cylindrical body but less than said outermost diameter of said saw teeth.

10. An apparatus according to claim 9 wherein said guide ring is a single integral member.

* * * * *